(12) United States Patent
Persohn et al.

(10) Patent No.: US 6,588,805 B2
(45) Date of Patent: Jul. 8, 2003

(54) COUPLING ADAPTER AND ASSEMBLY

(75) Inventors: Matthew M. Persohn, Toledo, OH (US); Terry L. Karl, Blissfield, MI (US); Richard Faber, Horton, MI (US); Todd J. Vogel, Waterville, OH (US); David S. Densel, Whitehouse, OH (US); Philip C. Van Riper, Holland, OH (US)

(73) Assignee: Eaton Aeroquip, Inc., Maumee, OH (US)

( * ) Notice: Subject to any disclaimer, the term of this patent is extended or adjusted under 35 U.S.C. 154(b) by 0 days.

(21) Appl. No.: 09/965,464

(22) Filed: Sep. 27, 2001

(65) Prior Publication Data

US 2002/0038955 A1 Apr. 4, 2002

Related U.S. Application Data

(60) Provisional application No. 60/237,648, filed on Oct. 3, 2000.

(51) Int. Cl.$^7$ .................................................. F16L 37/00
(52) U.S. Cl. ...................... 285/305; 285/382; 285/321; 285/347
(58) Field of Search ................................ 285/382, 382.1, 285/382.2, 321, 305, 347

(56) References Cited

U.S. PATENT DOCUMENTS

| | | | |
|---|---|---|---|
| 4,294,473 A | * 10/1981 | Ekman | ........................ 285/321 |
| 5,226,682 A | 7/1993 | Marrison et al. | |
| 5,419,594 A | * 5/1995 | Nelms | ........................ 285/315 |
| 5,553,895 A | 9/1996 | Karl et al. | |
| 5,673,945 A | * 10/1997 | Olson | ........................ 285/382 |
| 5,681,061 A | * 10/1997 | Olson | ........................ 285/382 |
| 6,170,887 B1 | * 1/2001 | Salomon-Bahls et al. | ... 285/382 |
| 6,183,020 B1 | 2/2001 | Luft | |
| 6,186,557 B1 | * 2/2001 | Funk | ........................ 285/321 |

FOREIGN PATENT DOCUMENTS

| DE | 7817051 U | 8/1980 |
|---|---|---|
| EP | 0947759 A | 10/1999 |

* cited by examiner

Primary Examiner—Lynne H. Browne
Assistant Examiner—Aaron Dunwoody
(74) Attorney, Agent, or Firm—Rader, Fishman & Grauer PLLC

(57) ABSTRACT

The present invention includes a pre-assembled, high-pressure coupling interface adapter for use with a non-threaded port of a female member. The adapter comprises a generally cylindrically shaped metal body including a central longitudinal channel and an inner and outer surface. The body includes an external segment having an external end and an internal segment having an internal end, the internal segment configured for receipt within the port of the female member. The inner surface of the body is configured to engage and secure one or more external features of a separate male coupling member. The present invention also includes a coupling assembly including a coupling adapter and a method for forming a female coupling assembly including an adapter.

19 Claims, 8 Drawing Sheets

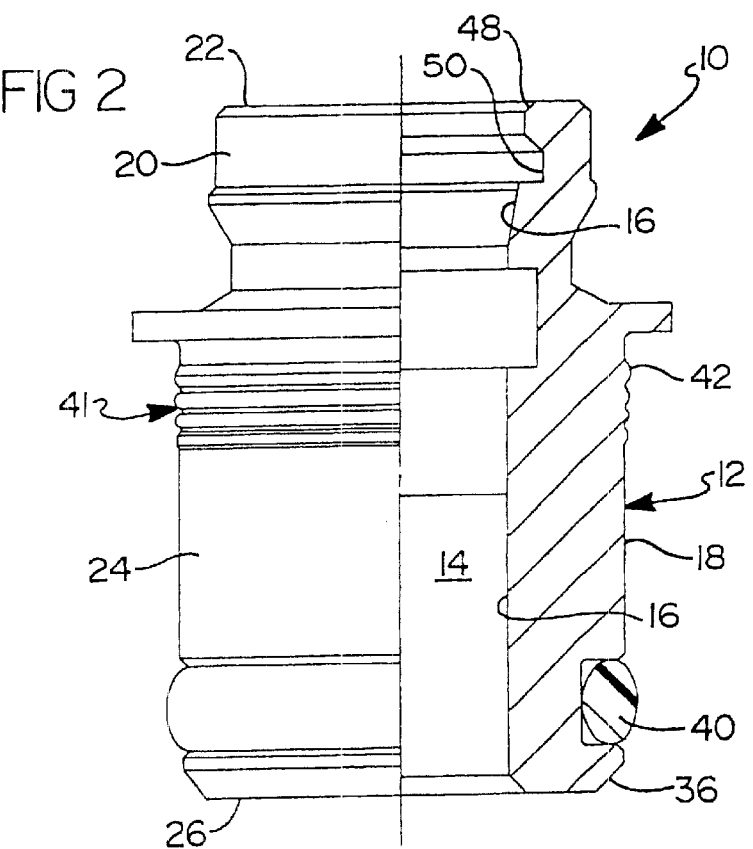
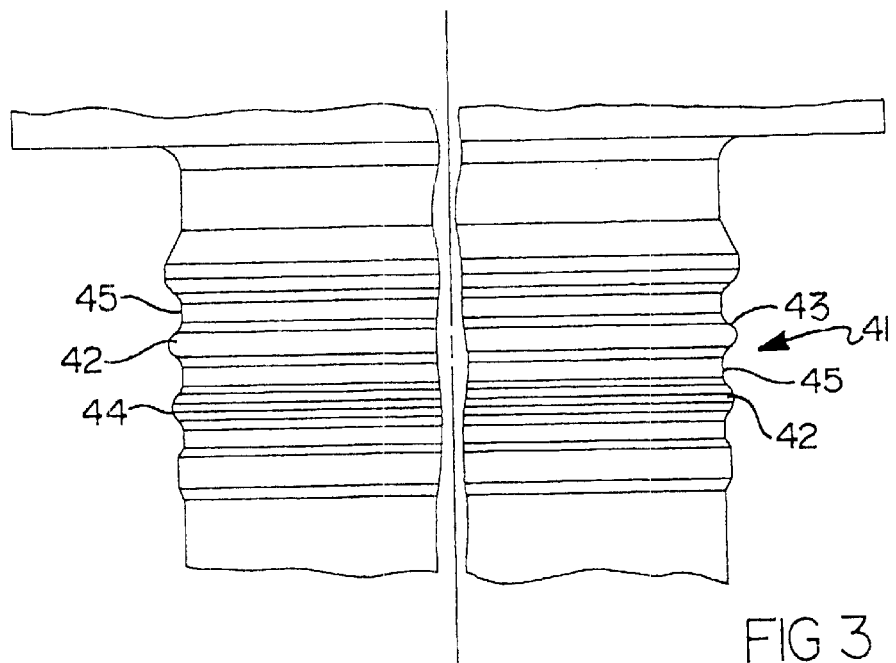

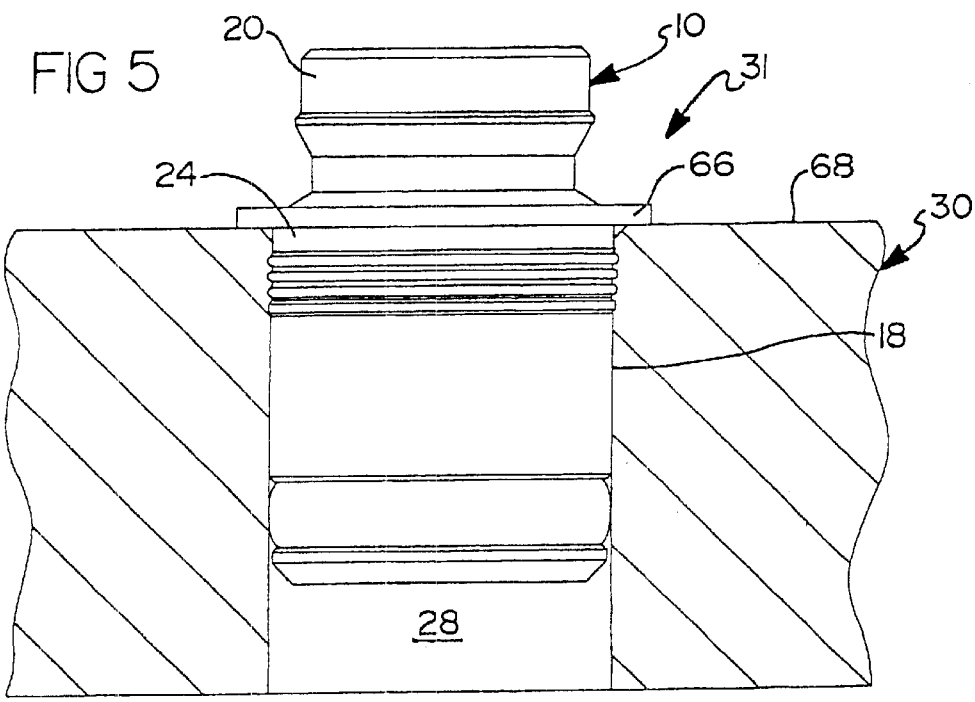
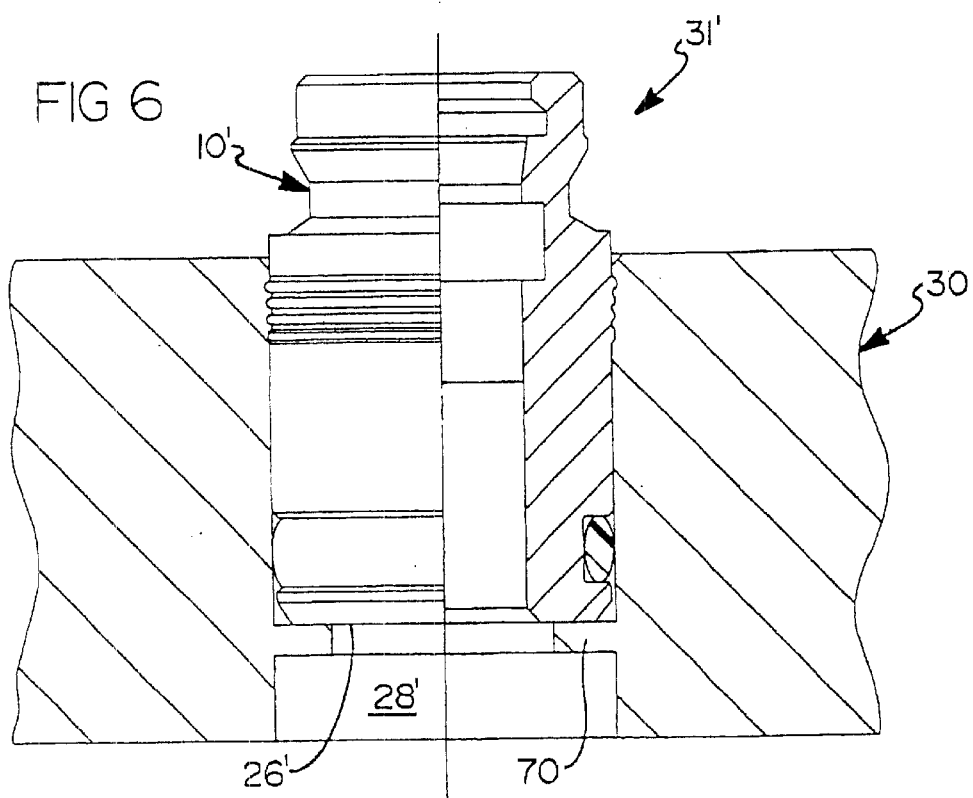

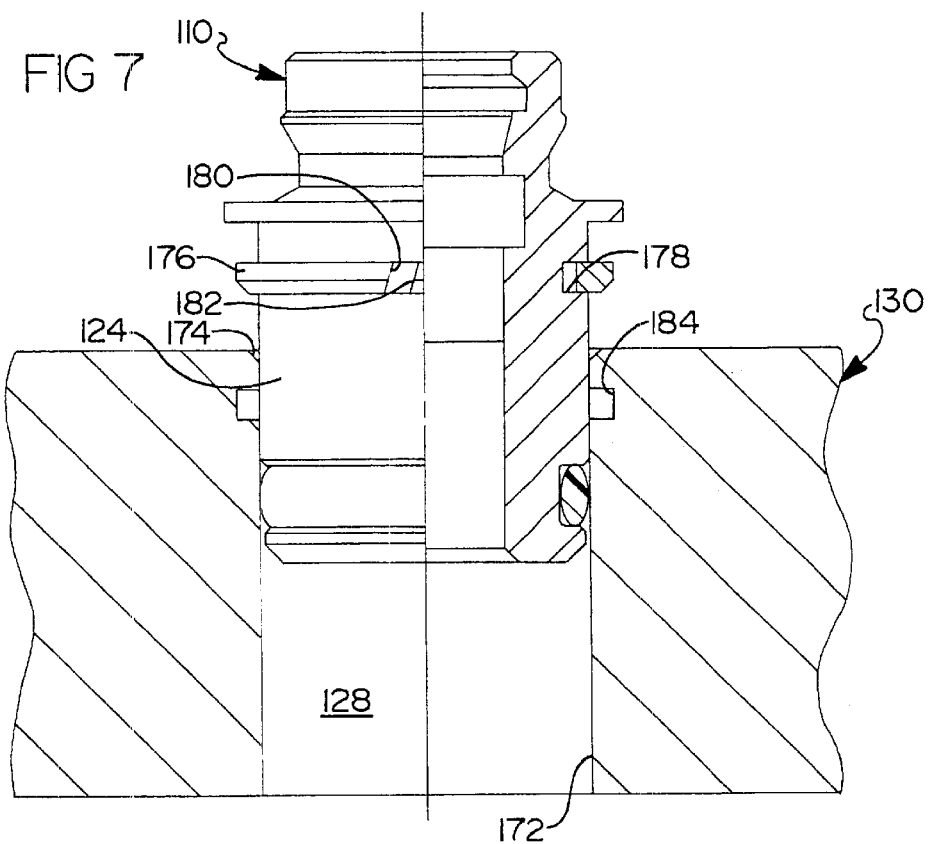
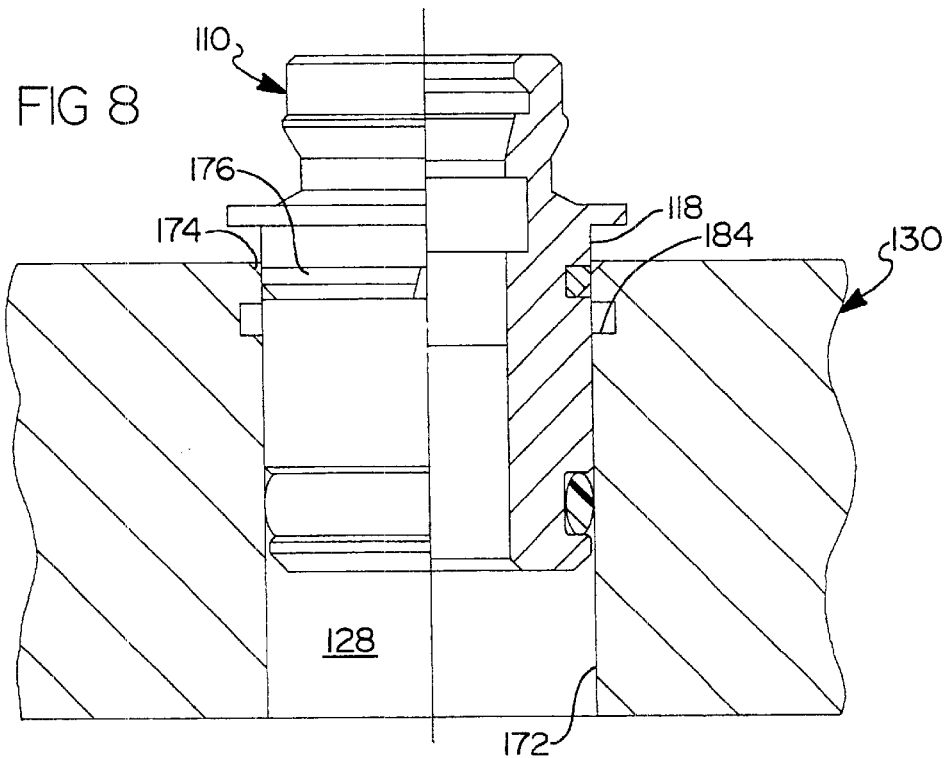

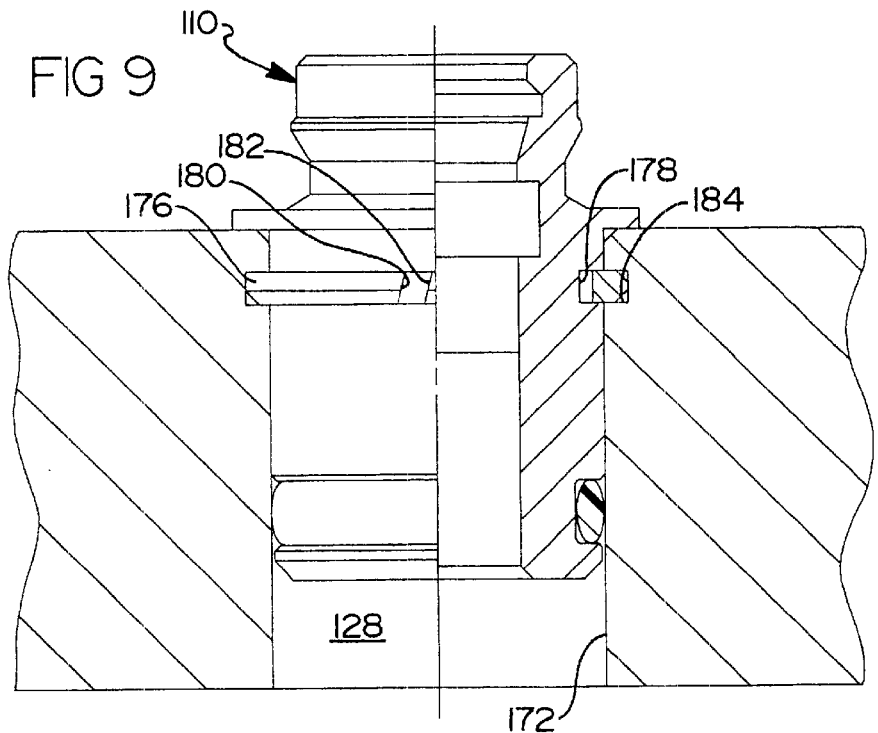
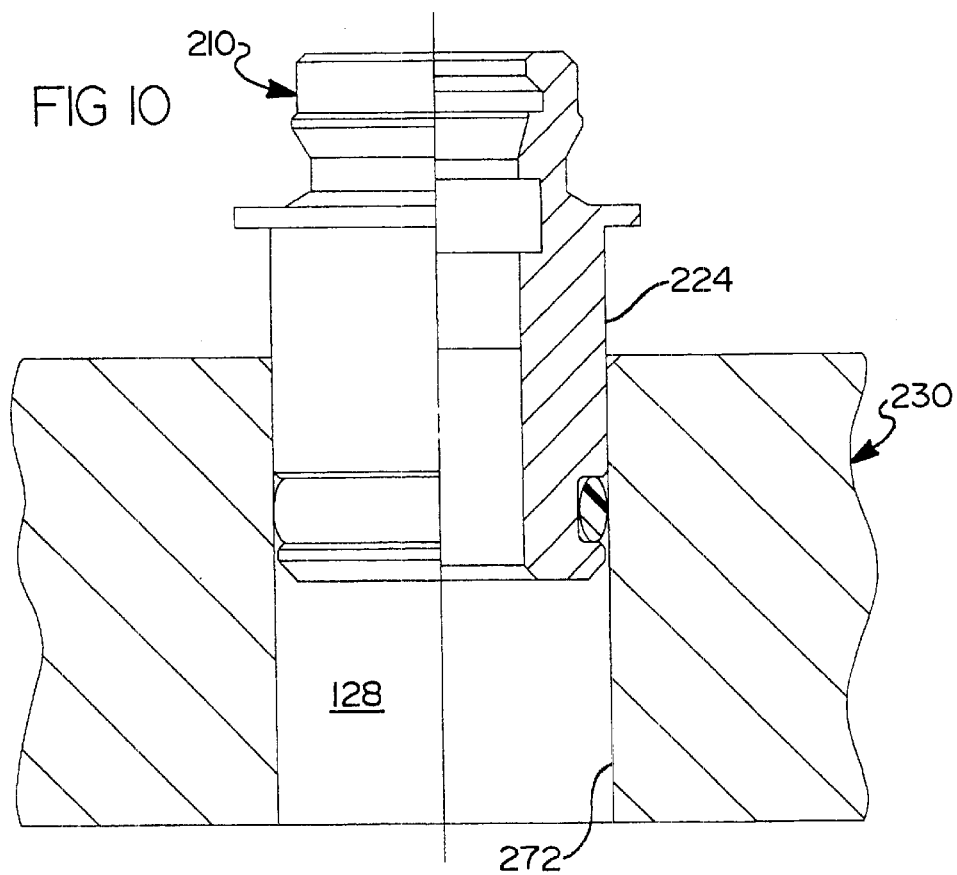

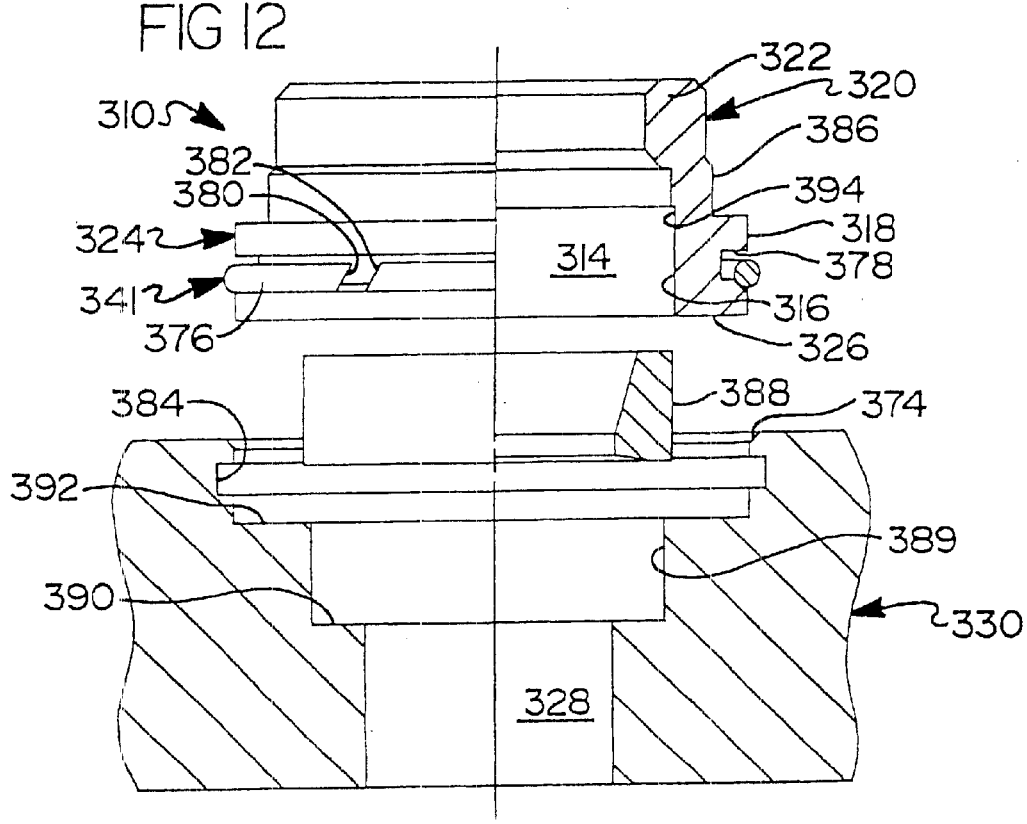
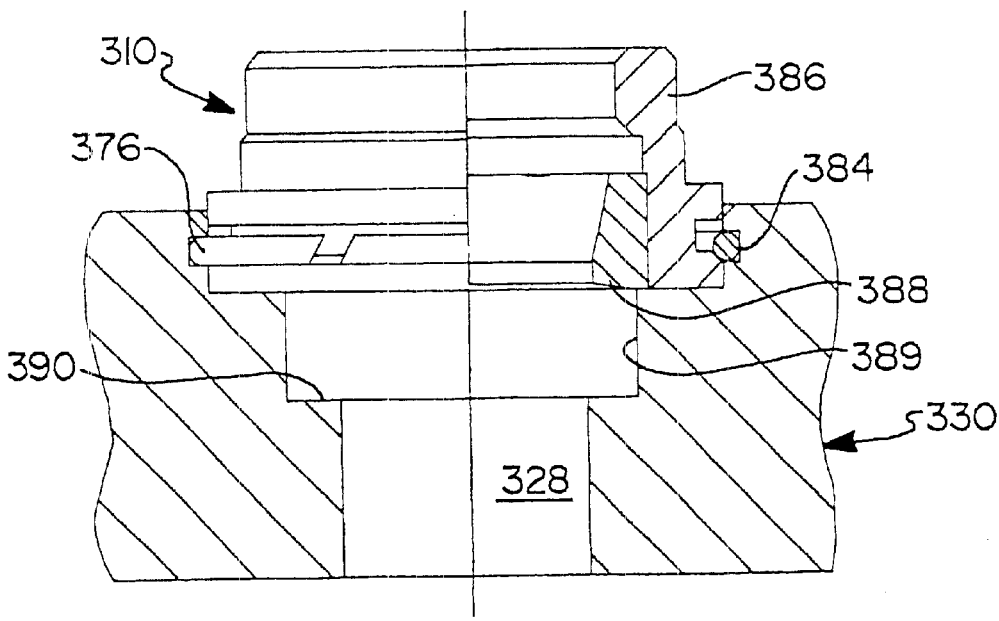

COUPLING ADAPTER AND ASSEMBLY

CROSS REFERENCE TO RELATED APPLICATION

This application claims benefit of U.S. Provisional Application Serial No. 60/237,648, which was filed Oct. 3, 2000.

TECHNICAL FIELD

The present invention relates generally to coupling assemblies, and more particularly to coupling adapters and coupling assemblies including a coupling adapter.

BACKGROUND ART

Coupling assemblies comprised of male and female members are known in the art. Conventional adapters for coupling assemblies, such as hydraulic steel adapters, typically include a threaded portion that is configured to engage an appropriately threaded port of a mating female member. The adapter and mating female member together form a female coupling assembly for engaging a corresponding male coupling member that is suitable for both low-pressure and high-pressure coupling applications. Such threaded adapters and female ports generally require the use of more complex or involved machining techniques, which can be costly and/or inefficient to manufacture.

SUMMARY OF THE INVENTION

The present invention provides an adapter for a coupling assembly that may be "press fit" or otherwise conventionally retained within a non-threaded port of a female member.

In accordance with an embodiment of the present invention, a preassembled, high-pressure coupling interface adapter is provided that includes a generally cylindrically-shaped metal body having a central longitudinal channel and an inner and outer surface. The body further includes an external segment having an external end and an internal segment having an internal end, the internal segment configured for receipt within a non-threaded port of the female member. The central longitudinal channel of the body extends from the external end to the internal end and the inner surface of the body is configured to engage and secure a separate male coupling member. In a preferred embodiment, the outer surface of the internal segment of the body includes a fit portion that engages an internal surface of the non-threaded port of the female member.

When securely retained within the female member, the adapter and female member comprise a female coupling assembly for engaging a corresponding male coupling member that is suitable for both low-pressure and high-pressure coupling applications. Further, depending upon the circumstances and intended environment, the adapter may be designed and configured with features for quick-connect and/or disconnect from a corresponding male coupling member.

Among other advantages, the present invention provides an adapter that may be "press fit" or otherwise conventionally retained within a non-threaded port of a female member, thereby eliminating the need to machine a thread. Further, an adapter of the type taught by the present invention can provide a means to connect male coupling members to ports that have lesser material strength and/or have a more porous nature than traditional adapters. The present invention also lends itself to the retrofitting of current coupling assemblies to provide, when appropriate and desired, a quick-connect and/or releasable coupling assembly.

BRIEF DESCRIPTION OF THE DRAWINGS

The features and inventive aspects of the present invention will become more apparent upon reading the following detailed description, claims, and drawings, of which the following is a brief description:

FIG. 2 is a partial cross-sectional view of an adapter according to the preferred embodiment.

FIG. 3 is an enlarged view of a fit portion according to the preferred embodiment.

FIG. 5 is a partial cross-sectional view showing the adapter after insertion into a female member.

FIG. 6 is a partial cross-sectional view of a second embodiment showing an adapter inserted into a female member.

FIG. 7 is a partial cross-sectional view of a third embodiment showing an adapter during insertion into a female member.

FIG. 8 is a partial cross-sectional view of the adapter of FIG. 7 during insertion into the female member showing the compression of an annular locking ring.

FIG. 9 is a partial cross-sectional view showing the adapter of FIG. 7 after insertion into the female member.

FIG. 10 is a partial cross-sectional view of a fourth embodiment showing an adapter during insertion into a female member.

FIG. 12 is a partial cross-sectional and exploded view of an adapter according to a fifth embodiment.

FIG. 13 is a partial cross-sectional view of the adapter of FIG. 12 after insertion into a female member.

BEST MODE FOR CARRYING OUT THE INVENTION

Figure 1:
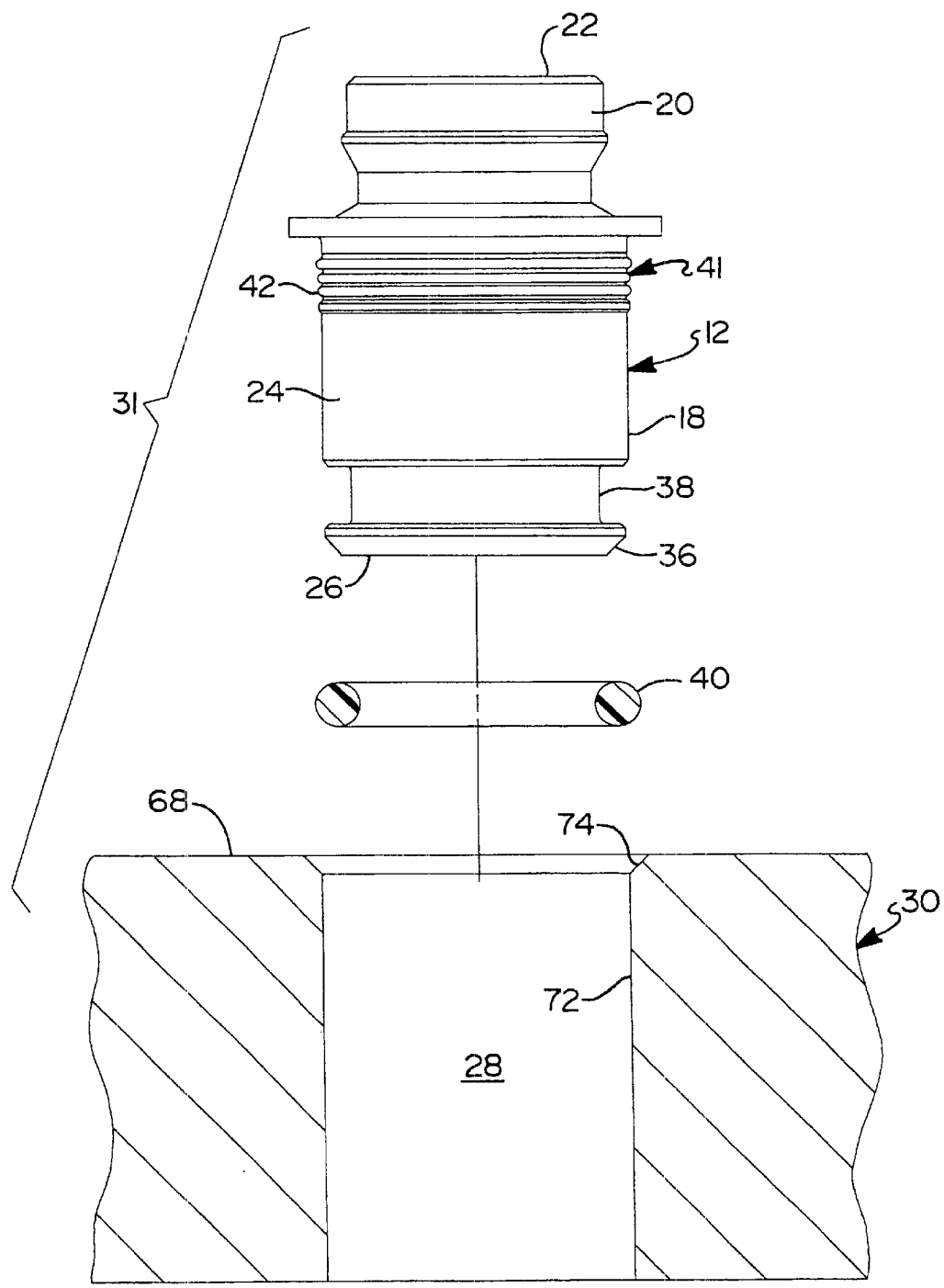
FIG. 1 is an exploded view of a preferred embodiment of the present invention showing an adapter, flexible member and female member.

Referring now to the drawings, the preferred embodiments of the present invention are described in detail. Referring to FIGS. 1 and 2, a preferred embodiment of a coupling interface adapter 10 is shown that includes a generally cylindrically-shaped metal body 12 having a central longitudinal channel 14 and an inner and outer surface 16 and 18, respectively. Body 12 further includes an external segment 20 having an external end 22 and an internal segment 24 having an internal end 26. Central longitudinal channel 14 of body 12 extends from external end 22 to internal end 26. Internal segment 24 is configured for receipt within a port 28 of a female member 30, such as a manifold. The configuration of port 28 may be of a conventional design, such as that disclosed in proposed SAE standard J2494-4, which is hereby incorporated by reference in its entirety. When securely retained within port 28, adapter 10 and female member 30 together comprise a female coupling assembly 31 suitable for engaging a corresponding male coupling member, as will be described in further detail below.

In a preferred embodiment, outer surface 18 of internal segment 24 includes a lead-in chamfer 36 adjacent internal end 26 that forms a chamfer angle relative to outer surface 18. The angle of chamfer 36 is preferably greater than approximately 30 degrees and, more preferably, greater than approximately 40 degrees. Chamfer 36 is designed to aid in positioning internal end 26 within port 28 for insertion into female member 30. An annular groove 38 is preferably positioned proximate internal end 26 and is sized to receive a flexible member 40, such as an O-ring. Flexible member 40 functions to create a seal to inhibit fluid leakage between port 28 and adapter 10 and also provides a means of dampening vibrational energy transmitted between port 28 and adapter 10.

As best shown in FIG. 3, outer surface 18 further includes a fit portion 41 having at least one outward radially projecting fitting protrusion 42. While the outer radial portion of fitting protrusion 42 preferably includes a generally semi-circular outer radius 43, it is recognized that the outer radial portion of fitting protrusion 42 may exhibit other profiles, such as a generally flat profile 44 for example. As illustrated in FIG. 3, fit portion 41 preferably includes a plurality of fitting protrusions 42 separated by substantially flat outer surface segments 45. Fitting protrusions 42 and segments 45 create a series of "peaks" and "valleys" for facilitating the retention of adapter 10 within port 28. The material of female member 30 preferably exhibits a lesser material strength and/or a more porous composition than the material of adapter 10 permitting fitting protrusions 42 to engage or "lock" into female member 30 by means of a mini-broaching-type technique in which the material of female member 30 is pulled or forced down into the "valleys" created between fitting protrusions 42.

Fitting protrusions 42 are generally sized and positioned to minimize the work, i.e. force times distance, required to insert adapter 10 into port 28. It is recognized that increasing the number of fitting protrusions 42 generally increases the work required to insert adapter 10 into port 28 and, alternatively, decreasing the number of fitting protrusions 42 generally decreases the work required to insert adapter 10, if they are the same diameter. Fitting protrusions may be of substantially equal diameter or, alternatively, may decrease in diameter in a direction away from external segment 20, as shown in FIG. 3, to decrease the work required to insert adapter 10 into port 28.

Figure 4:
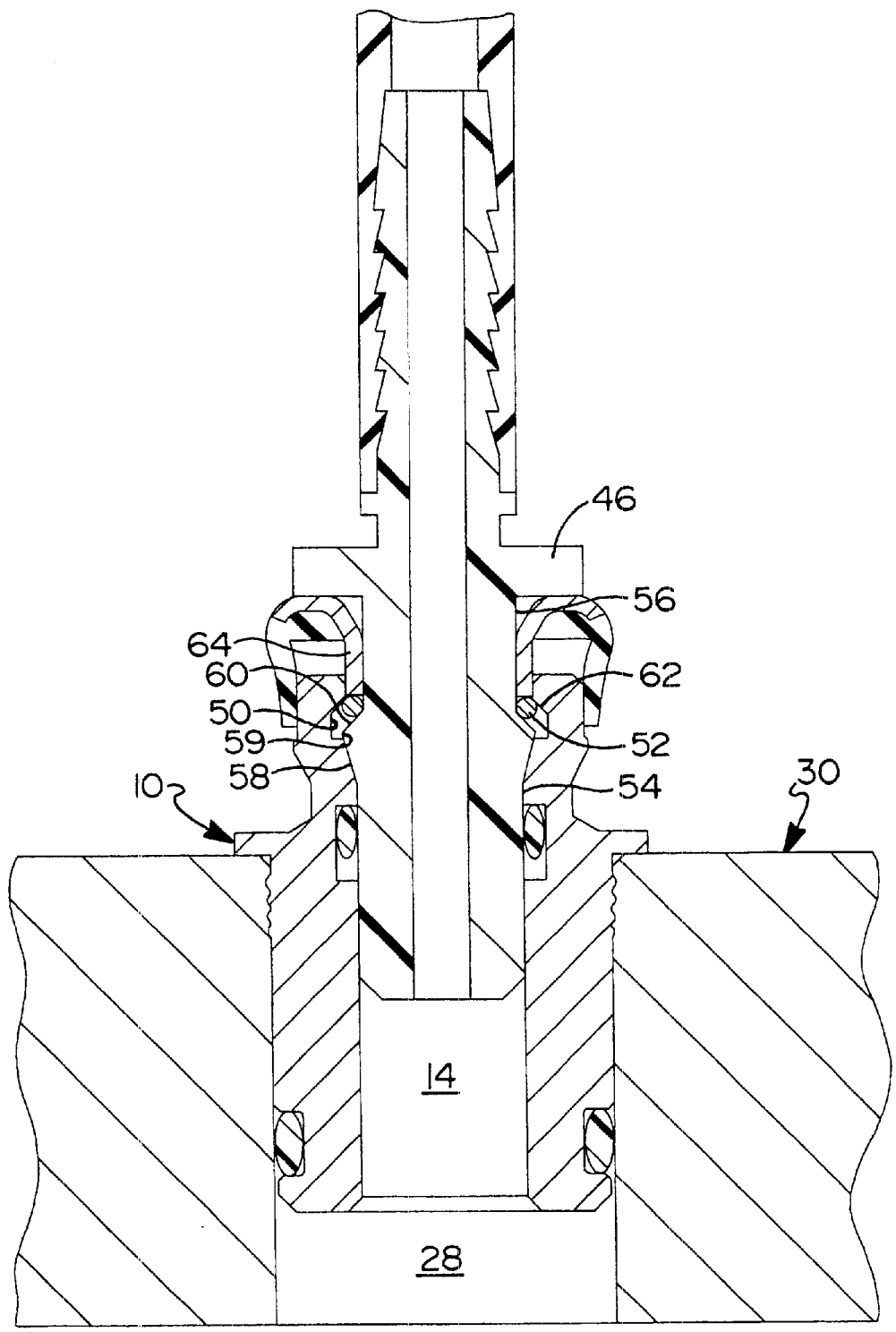
FIG. 4 is a cross-sectional view showing a male coupling member after insertion into the adapter.

Referring to FIGS. 2 and 4, external segment 20 of adapter 10 generally includes a means of engaging and securing a separate male coupling member 46. An example of such a male coupling member is disclosed in a pending U.S. patent application Ser. No. 09/784,258, filed Feb. 15, 2001, which is owned by the assignee of the present invention and is hereby incorporated by reference in its entirety. In a preferred embodiment, inner surface 16 of external segment 20 includes a chamfered segment 48 adjacent external end 22 that forms an angle relative to central longitudinal channel 14. The chamfer angle is preferably greater than approximately 30 degrees and, more preferably, greater than approximately 40 degrees. Inner surface 16 includes at least one groove 50 located axially inward of external end 22. Groove 50 is sized and positioned to receive an annular locking member 52, as shown in FIG. 4, which is preferably formed of a metal, and more preferably stainless steel. The metal of locking member 52 is preferably spring tempered so that locking member 52 has flexibility to expand and return to its original shape. Preferably, locking member 52 is not continuous, but includes a space between two ends (not illustrated) thereby allowing locking member 52 to expand and contract without altering its annular shape. When male member 46 is disconnected from adapter 10, locking member 52 has an external diameter less than the inside diameter of groove 50, but larger than the diameter of a first exterior surface 54 of male member 46. Additionally, locking member 52 has an internal diameter substantially equal to or, preferably slightly smaller than that of a second exterior surface 56 of male member 46 allowing locking member 52 to tightly engage male member 46 when male member 46 is inserted into longitudinal channel 14.

Referring to FIG. 4, as male member 46 is inserted into longitudinal channel 14, first exterior surface 54 passes through the inside diameter of locking member 52 until a ramp 58 on male member 46 reaches locking member 52. Upon further insertion, locking member 52 is forced to travel up ramp 58 thereby expanding locking member 52 until it reaches the apex 59 of ramp 58. Although apex 59 is shown as a point, it may also comprise a generally longitudinal extending flat. As apex 59 moves past locking member 52, the resilience of its metal composition causes locking member 52 to contract toward its initial unexpanded state as it travels down a shoulder 60, until it contacts second exterior surface 56. Upon complete insertion of male member 46 into adapter 10, locking member 52 is positioned substantially between shoulder 60 and second exterior surface 56 of male member 46 and a chamfer 62 in adapter 10. Subsequent movement of male member 46 in a direction away from adapter 10 forces locking member 52 to engage both shoulder 42 and chamfer 62, thereby preventing the removal of male coupling member 46 from adapter 10. When it is desirable it remove male coupling member 46 from adapter 10, a release sleeve 64 is slid axially on second exterior surface 56 of male member 46 to engage and force locking member 52 over shoulder 60, allowing male member 46 to be removed from adapter 10. Further examples of coupling assemblies having a male/female interface may be seen by reference to U.S. Pat. Nos. 5,226,682; 5,553,895; and 5,570,910, the disclosures of which are hereby incorporated by reference in their entirety.

The foregoing means for engaging and securing male member 46 is configured for quick connect and/or disconnect of male member 46 from adapter 10. Although the preferred means for securing adapter 10 to male coupling member 46 has been described above, it is recognized that other means for securing adapter 10 to male member 46 may be employed. For example, inner surface 16 of external segment 20 may contain a plurality of threads for engaging a corresponding thread pattern on first exterior surface 54 of male member 46.

Referring to FIG. 5, in a preferred embodiment, outer surface 18 of adapter 10 includes an annular flange 66 positioned between external segment 20 and internal segment 24. Flange 66 is designed to engage a generally flat external surface 68 of female member 30 to limit the insertion length of adapter 10 into port 28. It is recognized, however, that an alternative means of limiting the insertion length of adapter 10 may also be employed. For example, as shown in FIG. 6, a second embodiment of female coupling assembly 31 is provided having a port 28' that includes a radially inwardly projecting fin 70 designed to engage internal end 26' of adapter 10'. The depth of fin 70 in port 28' generally corresponds to the desired insertion length of adapter 10 into port 28'. This configuration permits adapter 10' to be manufactured without an annular flange 66 resulting in a simplification of manufacture and a material cost savings.

Referring again to FIG. 1, port 28 of female coupling member 30 preferably includes a substantially smooth, non-threaded, internal surface 72 that extends from external surface 68. Internal surface 72 preferably includes an external chamfer segment 74 adjacent external surface 68 that forms a chamfer angle relative to port 28. Chamfer segment 74 cooperates with chamfer 36 in adapter 10 to guide the insertion of adapter 10 into port 28. The diameter of port 28 is slightly smaller than the diameter of fitting protrusions 42 requiring adapter 10 to be inserted into port 28 under force. In order to secure adapter 10 into port 28, internal segment 24 of adapter 10 is aligned and inserted into port 28 until fit portion 42 engages internal surface 72. In a preferred embodiment, adapter 10 comprises a material having a relatively high material strength, such as steel, and female member 30 comprises a material having a lesser material strength and/or a more porous nature, such as brass. Adapter 10 is then pressed into port 28 under a pressure sufficient to cause the relatively "softer" material of female member 30 proximate internal surface 72 to be forced into the "valleys" between fitting protrusions 42 and segments 45.

Alternatively, it may be appreciated by those skilled in the art that internal surface 72 of female member 30 may include fit portion 41 and that adapter 10 may comprise a material having a lesser material strength and/or a more porous nature than the material of female member 30. In this configuration, i.e. the inverse of the configuration described in the preferred embodiment, adapter 10 is pressed into port 28 under a pressure sufficient to cause the relatively "softer" material of adapter 10 to be forced into the "valleys" between the fitting protrusions and segments in female member 30. It may also be appreciated by those skilled in the art that adapter 10 may include fit portion 41 and comprise a material having a lesser material strength and/or a more porous nature than the material of female member 30. In this configuration, adapter 10 is pressed into port 28 under a pressure sufficient to cause the relatively "softer" material of adapter 10, more particularly fit portion 41, to deform and create a compression fit type of engagement.

FIGS. 7–9 disclose partial cross-sectional views of a third embodiment of the present invention. In this embodiment, an adapter 110 is shown that is substantially similar to adapter 10 in the preferred embodiment with at least one exception, namely, the fit portion comprises a generally annular locking member 176 retained in an annular cavity 178. Locking member 176 is preferably formed of a metal, and more preferably is spring tempered such that locking member 176 has the flexibility to contract upon application of a sufficient inwardly directed radial force and then expand to its original shape when that force is removed. Preferably, locking member 176 is not continuous, but includes a space between two ends 180, 182 to allow locking member 176 to contract and expand without altering its annular shape. Before adapter 110 is inserted into port 128, locking member 176 has an external diameter greater than the diameter of internal surface 172 of port 128. In order to secure adapter 110 into port 128, internal segment 124 of adapter 110 is aligned and inserted into port 128 until locking member 176 engages a chamfer segment 174. Referring to FIG. 8, upon further insertion, chamfer segment 174 forces locking member 176 to compress into cavity 178 until locking member 176 is flush with outer surface 118 of adapter 110. Adapter 110 is further inserted until locking member 176 reaches an annular groove 184 in port 128, whereby locking member 176 expands into groove 184, as shown in FIG. 9. In this configuration, a portion of locking member 176 resides in both cavity 178 of adapter 110 and groove 184 of female member 130 to prevent the removal of adapter 110 from port 128.

Figure 11:
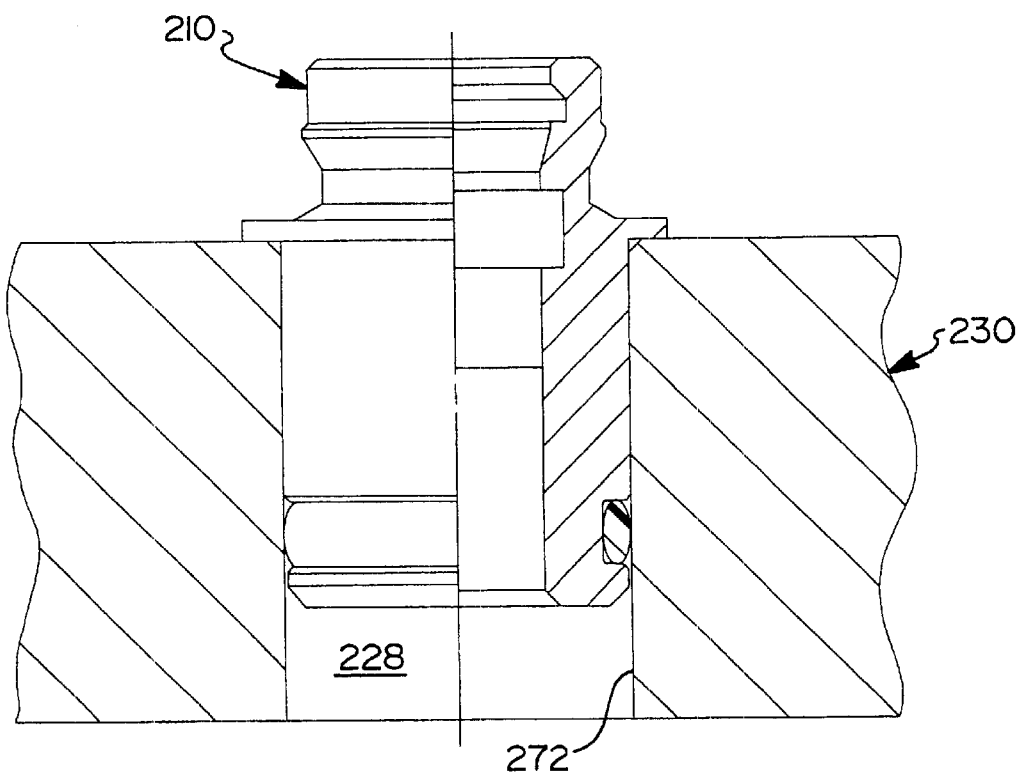
FIG. 11 is a partial cross-sectional view showing the adapter of FIG. 10 after insertion into a female member.

FIGS. 10 and 11 disclose partial cross-sectional views of a fourth embodiment of the present invention. In this embodiment, an adapter 210 is shown that is substantially similar to adapter 10 in the preferred embodiment with at least one exception, namely, fit portion comprises a substantially flat outer surface that is slightly larger in diameter than port 228. In order to secure adapter 210 into port 228, the temperature of adapter 210 and/or female coupling member 230 is lowered substantially below the ambient temperature by immersion into a cryogen, such as liquid nitrogen for example, causing the chilled component(s) 210, 230 to contract. Internal segment 224 of adapter 210 is then aligned and inserted into port 228 under pressure or without pressure depending on the temperature and degree of contraction of the mating components 210, 230. As the mating components 210, 230 are allowed to return to the ambient temperature, the components expand causing internal surface 272 of port 228 to engage internal segment 224 of adapter 210, as shown in FIG. 11, to retain adapter 210 in female member 230. The approach of using a cryogen may also be utilized with the first embodiment to minimize insertion forces, wherein protrusions 42 expand into female member 30 to create the type of fit noted above.

FIGS. 12 and 13 disclose partial cross-sectional views of a fifth embodiment of the present invention. In this embodiment, an adapter 310 is shown that includes a body 386 and an insert 388 positioned between body 386 and a female member 330. Body 386 includes a central longitudinal channel 314 and an inner and outer surface 316 and 318, respectively. Body 386 further includes an external segment 320 having an external end 322 and an internal segment 324 having an internal end 326. Central longitudinal channel 314 of body 386 extends from external end 322 to internal end 326. Internal segment 324 is configured for receipt within a port 328 of female member 330. Body 386 and insert 388 may be machined out of a suitable metal such as steel or, alternatively, may be made of a powder metal.

A gland 389 configured for receipt of a sealing member, such as an O-ring, is created between insert 388 and a first ledge 390 in port 328. Upon insertion of adapter 310 into port 328, insert 388 rests on a second ledge 392 along with body 386, which is retained in port 328 by a fit portion 341. The second ledge 392 cooperates with a shoulder 394 in body 386 to prevent axial movement of insert 388 relative to female member 330 and body 386.

The fit portion 341 comprises a generally annular locking member 376 received in an annular cavity 378. Locking member 376 is preferably formed of a metal, and more preferably is spring tempered such that locking member 376 has the flexibility to contract upon application of a sufficient inwardly directed radial force and then expand to its original shape when that force is removed. Preferably, locking member 376 is not continuous, but includes a space between two ends 380, 382 to allow locking member 376 to contract and expand without altering its annular shape.

In order to secure adapter 310 into port 328, internal segment 324 of body 386 and insert 388 are aligned and inserted into port 328 until locking member 376 engages a chamfer segment 374. Upon further insertion, chamfer segment 374 forces locking member 376 to compress into cavity 378 until locking member 376 is flush with outer surface 318 of adapter 310. Adapter 310 is further inserted until locking member 376 reaches an annular groove 384 in port 328, whereby locking member 376 expands into groove 384, as shown in FIG. 13. In this configuration, a portion of locking member 376 resides in both cavity 378 of adapter 310 and groove 384 of female member 330 to prevent the removal of adapter 310 from port 328.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A high-pressure coupling interface adapter for use with a female member having a port that includes an internal surface, the adapter comprising a generally cylindrically-shaped body having a central longitudinal channel and an inner and outer surface, the body further including:
   an external segment having an external end;
   an internal segment having an internal end, the internal segment configured for receipt within the port of the female member; and
   wherein the central longitudinal channel extends from the external end to the internal end, the body is configured to engage and secure a separate male coupling member, and the outer surface of the internal segment of the body includes a fit portion for engaging the female member and a groove position between the fit portion and the internal end of the body for receiving an o-ring, wherein the fit portion includes a plurality of longitudinally spaced, substantially annular fitting protrusions.

2. An adapter as recited in claim 1, wherein the outer surface of the internal segment includes a lead-in chamfer adjacent the internal end that forms a chamfer angle relative to the outer surface.

3. An adapter as recited in claim 1, wherein the fit portion includes at least one outward radially-projecting fitting protrusion.

4. An adapter as recited in claim 1, wherein the fit portion comprises a resilient locking member received within a cavity.

5. An adapter as recited in claim 1, wherein the outer surface of the body includes an annular flange positioned in proximity to the internal segment of the body.

6. An adapter as recited in claim 1, wherein the inner surface of the external segment includes a chamfered segment adjacent the external end that forms a chamfer angle relative to the central longitudinal channel.

7. An adapter as recited in claim 1, wherein the inner surface of the body includes a resiliently expandable locking ring that engages a rib on the separate male coupling member to secure the male coupling member to the adapter.

8. An adapter as recited in claim 1, further including a substantially rigid insert positioned between the body and the female member.

9. A high-pressure coupling interface adapter for use with a female member having a port that includes an internal surface, the adapter comprising a generally cylindrically-shaped metal body having a central longitudinal channel and an inner and outer surface, the body further including:
   an external segment having an external end;
   an internal segment having an internal end, the internal segment configured for receipt within the port of the female member; and
   wherein the central longitudinal channel extends from the external end to the internal end; the inner surface of the body is configured to engage and secure one or more external features of a separate male coupling member; the inner surface of the external segment includes an external chamfered segment adjacent the external end, the external chamfered segment forming an external chamfer angle relative to the central longitudinal channel greater than about 30 degrees; the outer surface of the body includes an annular flange positioned in proximity to the internal segment of the body; and the outer surface of the internal segment of the body includes a lead-in chamfer adjacent the internal end, the chamfer forming a chamfer angle greater than about 30 degrees relative to the outer surface and a fit portion positioned behind the annular flange, the fit portion including a plurality of longitudinally spaced, outward radially-projecting annular fitting protrusions.

10. A female coupling assembly, including a female member having a port that includes a substantially smooth, non-threaded, internal surface and a separate, pre-assembled, high-pressure coupling interface adapter at least partially secured within the port, the adapter comprising a generally cylindrically-shaped metal body having a central longitudinal channel and an inner and outer surface, the body further including:
   an external segment having an external end;
   an internal segment having an internal end, the internal segment secured within the port; and
   wherein the central longitudinal channel extends from the external end to the internal end; the inner surface of the body includes an annular groove for receiving a locking ring and is configured to engage and secure one or more external features of a separate male coupling member; the inner surface of the external segment includes an external chamfered segment adjacent the external end, the external chamfered segment forming an external chamfer angle relative to the central longitudinal channel greater than about 30 degrees; the outer surface of the body includes an annular flange positioned in proximity to the internal segment of the body; and the outer surface of the internal segment of the body includes an O-ring groove positioned in the outer surface of the internal segment in proximity with the internal end, a lead-in chamfer adjacent the internal end, the chamfer forming a chamfer angle greater than about 30 degrees relative to the central longitudinal channel, and a fit portion positioned behind the annular flange, the fit portion including at least one outward radially projecting annular fitting protrusion engaged with the internal surface of the port.

11. A high-pressure coupling interface adapter for use with a female member having a port that includes an internal surface, the adapter comprising a generally cylindrically-shaped body having a central longitudinal channel and an inner and outer surface, the body further including:
   an external segment having an external end;
   an internal segment having an internal end, the internal segment configured for receipt within the port of the female member; and
   wherein the central longitudinal channel extends from the external end to the internal end, the body is configured to engage and secure a separate male coupling member, and the outer surface of the internal segment of the body includes a fit portion for engaging the female member, wherein the fit portion includes a plurality of longitudinally spaced, substantially annular fitting protrusions.

12. An adapter as recited in claim 11, wherein the outer radial portions of the fitting protrusions include a generally semicircular outer radius.

13. An adapter as recited in claim 11, wherein the protrusions are separated by flat outer surface segments.

14. An adapter as recited in claim 11, wherein the fitting protrusions create a series of peaks and valleys for facilitating the press fitting of the adapter within the port of the female member.

15. A high-pressure coupling interface adapter for use with a female member having a port that includes an internal surface, the adapter comprising a generally cylindrically-shaped body having a central longitudinal channel and an inner and outer surface, the body further including:

an external segment having an external end;

an internal segment having an internal end, the internal segment configured for receipt within the port of the female member; and wherein the central longitudinal channel extends from the external end to the internal end, the inner surface of the body includes an annular groove for receiving a locking member to engage and secure a separate male coupling member, and the outer surface of the internal segment of the body includes a fit portion for engaging the female member, wherein the fit portion includes a plurality of longitudinally spaced, substantially annular fitting protrusions.

16. A high-pressure coupling interface adapter for use with a female member having a port that includes an internal surface, the adapter comprising a generally cylindrically-shaped body having a central longitudinal channel and an inner and outer surface, the body further including:

an external segment having an external end;

an internal segment having an internal end, the internal segment configured for receipt within the port of the female member; and wherein the central longitudinal channel extends from the external end to the internal end, the body is configured to engage and secure a separate male coupling member, and the outer surface of the internal segment of the body includes a fit portion for engaging the female member; and further including an insert positioned between the body and the female member, the insert and the body being made of powder metal.

17. A female coupling assembly comprising:

a female member having a port that includes an internal surface;

a separate, pre-assembled, high-pressure coupling interface adapter at least partially secured within the port, the adapter comprising a generally cylindrically-shaped body having a central longitudinal channel and an inner and outer surface, the body further including an external segment having an external end, an internal segment having an internal end, the internal segment secured within the port, the central longitudinal channel extending from the external end to the internal end, the inner surface of the body includes an annular groove for receiving a locking member to engage and secure one or more external features of a separate male coupling member, and the outer surface of the body including an annular flange positioned in proximity to the internal segment of the body; and wherein at least one of the female member and the adapter includes a fit portion engaged with either the internal segment of the body or the internal surface of the port.

18. A female coupling assembly as recited in claim 17, wherein the adapter comprises a material having at least one of a lesser material strength and a more porous nature than the material of the female member.

19. A female coupling assembly as recited in claim 17, wherein the fit portion includes at least one outward radially-projecting fitting protrusion.

* * * * *